US010863590B2

(12) United States Patent
Wi et al.

(10) Patent No.: US 10,863,590 B2
(45) Date of Patent: Dec. 8, 2020

(54) BATTERY CELL MANUFACTURING DEVICE USING INDUCTION HEATING

(71) Applicant: LG Chem, Ltd., Seoul (KR)

(72) Inventors: Yoon Bong Wi, Chungcheongbuk-do (KR); Tae Won Kang, Chungcheongbuk-do (KR); Sang Jin Woo, Gyeonggi-do (KR); Dong Hyeuk Park, Chungcheongbuk-do (KR); Jung Jae Lee, Gyeonggi-do (KR)

(73) Assignee: LG Chem, Ltd.

( * ) Notice: Subject to any disclaimer, the term of this patent is extended or adjusted under 35 U.S.C. 154(b) by 65 days.

(21) Appl. No.: 16/084,489

(22) PCT Filed: Dec. 19, 2017

(86) PCT No.: PCT/KR2017/015008
§ 371 (c)(1),
(2) Date: Sep. 12, 2018

(87) PCT Pub. No.: WO2018/128302
PCT Pub. Date: Jul. 12, 2018

(65) Prior Publication Data
US 2019/0082503 A1 Mar. 14, 2019

(30) Foreign Application Priority Data
Jan. 6, 2017 (KR) .................. 10-2017-0002205

(51) Int. Cl.
| | |
|---|---|
| H01M 2/08 | (2006.01) |
| H01M 4/04 | (2006.01) |
| H05B 6/04 | (2006.01) |
| H05B 6/36 | (2006.01) |
| C22C 21/00 | (2006.01) |
| H01M 10/04 | (2006.01) |

(Continued)

(52) U.S. Cl.
CPC .............. *H05B 6/04* (2013.01); *B29C 65/04* (2013.01); *C22C 21/00* (2013.01); *H01M 2/021* (2013.01);
(Continued)

(58) Field of Classification Search
CPC .... H01M 2/08; H01M 10/04; H01M 10/0404; H05B 6/04
See application file for complete search history.

(56) References Cited

U.S. PATENT DOCUMENTS

| | | |
|---|---|---|
| 2005/0169658 A1 | 8/2005 | Hanamoto et al. |
| 2016/0049682 A1 | 2/2016 | Won et al. |

FOREIGN PATENT DOCUMENTS

| | | |
|---|---|---|
| EP | 2869361 A1 | 5/2015 |
| EP | 3035432 A1 | 6/2016 |

(Continued)

OTHER PUBLICATIONS

Extended European Search Report including Written Opinion for Application No. 17890135.5 dated May 20, 2019, 8 pages.

(Continued)

*Primary Examiner* — Ula C Ruddock
*Assistant Examiner* — Frank A Chernow
(74) *Attorney, Agent, or Firm* — Lerner, David, Littenberg, Krumholz & Mentlik, LLP (57) ABSTRACT

A battery cell manufacturing apparatus for forming a sealing surplus portion includes a cradle configured to fix and mount a battery cell; one or more induction heating coils formed by winding an electrical wire at least one time at a position corresponding to an outer periphery of a pouch type case to generate an induced current in the outer periphery on which the sealing surplus portion is to be formed; a power supply configured to supply an alternating current to the induction heating coils; and at least two pressing members configured to press both sides of the outer periphery on which the sealing surplus portion is to be formed, wherein the outer periphery is induction-heated by a magnetic field generated (Continued)

in the induction heating coils and up to a temperature at which heat fusion is possible to form the sealing surplus portion.

19 Claims, 6 Drawing Sheets

(51) Int. Cl.
 *H01M 2/02* (2006.01)
 *B29C 65/04* (2006.01)
(52) U.S. Cl.
 CPC .......... *H01M 2/0237* (2013.01); *H01M 2/08* (2013.01); *H01M 10/0404* (2013.01); *H05B 6/36* (2013.01); *H01M 2220/20* (2013.01); *Y02P 10/25* (2015.11)

(56) References Cited

FOREIGN PATENT DOCUMENTS

| | | |
|---|---|---|
| JP | H11149910 A | 6/1999 |
| JP | 3818232 B2 | 9/2006 |
| JP | 2008004316 A | 1/2008 |
| JP | 2008269851 A | 11/2008 |
| JP | 4411968 B2 | 2/2010 |
| JP | 2011150846 A | 8/2011 |
| JP | 5060051 B2 | 10/2012 |
| JP | 5224658 B2 | 7/2013 |
| JP | 5515768 B2 | 6/2014 |
| KR | 20060041622 A | 5/2006 |
| KR | 101272178 B1 | 6/2013 |
| KR | 101287632 B1 | 7/2013 |
| KR | 1414437 B1 | 6/2014 |
| KR | 20140089455 A | 7/2014 |
| KR | 1452021 B1 | 10/2014 |
| KR | 20150025687 A | 3/2015 |
| KR | 20160031638 A | 3/2016 |
| KR | 20160096417 A | 8/2016 |
| WO | 2012165767 A2 | 12/2012 |
| WO | 2013184132 A1 | 12/2013 |

OTHER PUBLICATIONS

Search report from International Application No. PCT/KR2017/015008, dated Jun. 1, 2018.

BATTERY CELL MANUFACTURING DEVICE USING INDUCTION HEATING

CROSS-REFERENCE TO RELATED APPLICATIONS

The present application is a national phase entry under 35 U.S.C. § 371 of International Application No. PCT/KR2017/015008, filed Dec. 19, 2017, which claims priority to Korean Patent Application No. 10-2017-0002205 filed on Jan. 6, 2017 in the Republic of Korea, the disclosures of which are incorporated herein by reference.

TECHNICAL FIELD

The present disclosure relates to a battery cell manufacturing apparatus using induction heating.

RELATED ART

Due to the rapid increase in the use of fossil fuels, the demand for the use of alternative energy or clean energy is increasing. As a part of this trend, one of the most active research fields is electrochemical-based power generation and storage.

Currently, a typical example of an electrochemical device that utilizes electrochemical energy is a secondary battery, and its applications are gradually increasing.

In particular, in line with growing concerns about environmental issues, research into electric vehicles (EVs), hybrid EVs (HEVs), etc. which are able to replace vehicles that use fossil fuels such as gasoline vehicles and diesel vehicles, which are one of major causes of air pollution, has been actively conducted, and such a lithium secondary battery has been used as a power source for EVs, HEVs, etc.

In terms of a shape of a battery, the demand for prismatic type secondary batteries and pouch type secondary batteries which are thin enough to be applied to products that need to store high density energy in tight spaces is high. In terms of materials for batteries, the demand for lithium secondary batteries, such as lithium ion batteries and lithium ion polymer batteries, having high energy density, discharge voltage, and output stability is high.

The secondary battery may be classified based on a structure of an electrode assembly composed of a positive electrode, a negative electrode and a separator. Examples thereof include a jelly-roll type (wound type) electrode assembly having a structure in which long sheet type positive electrodes and negative electrodes are wound with a separator interposed therebetween, a stacked type (laminated type) electrode assembly in which a plurality of positive electrodes and negative electrodes cut in units of a predetermined size are sequentially stacked with a separator interposed therebetween and a stacked/folded type electrode assembly having a structure in which a bi-cell or full cell in which predetermined units of positive electrodes and negative electrodes are stacked with a separator interposed therebetween is wound up.

Recently, a pouch type battery having a structure in which a stacked type or stacked/folded type electrode assembly is embedded in a pouch type battery case of an aluminum laminate sheet has recently attracted much attention because of its low manufacturing cost, light weight, ease of shape deformation, etc., and its usage is gradually increasing.

Figure 1:
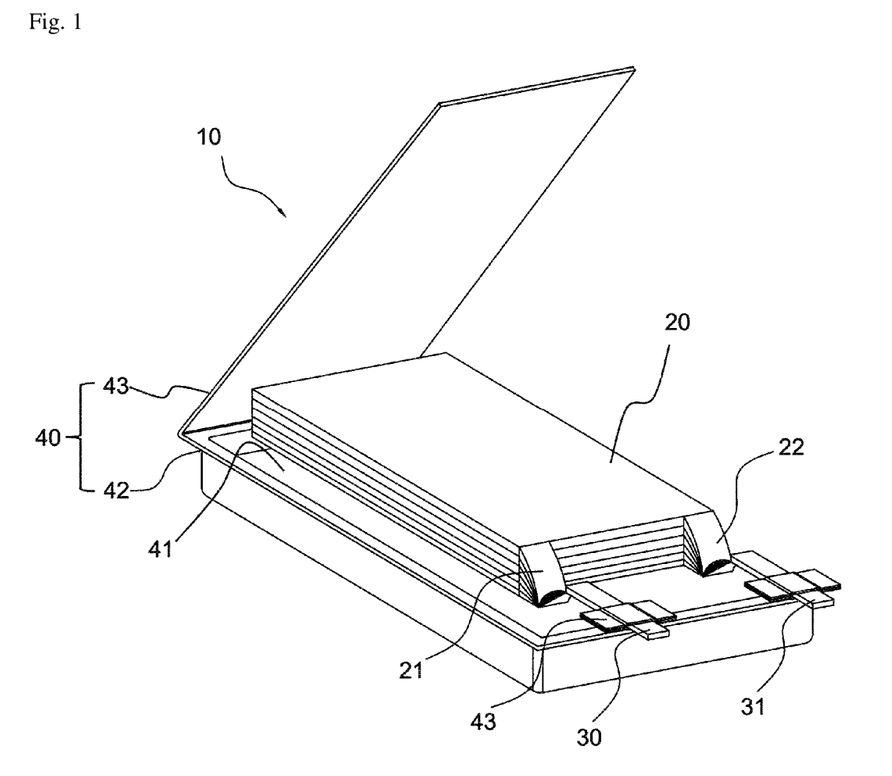
FIG. 1 is an exploded perspective view showing a general structure of a typical conventional pouch type secondary battery.

FIG. 1 schematically shows an exploded perspective view illustrating a general structure of a conventional pouch type battery cell.

Referring to FIG. 1, a pouch type battery cell 10 includes a stacked type electrode assembly 20 in which a plurality of electrode tabs 21 and 22 protrude, two electrode leads 30 and 31 each connected to the electrode tabs 21 and 22, and a battery case 40 having a structure in which the stacked type electrode assembly 20 is contained and sealed such that parts of the electrode leads 30 and 31 are exposed to the outside.

Also, the battery case 40 includes a lower case 42 including a concave shaped accommodation portion 41 in which the stacked type electrode assembly 20 can be seated and an upper case 43 sealing the stacked type electrode assembly 20 as a cover of the lower case 42. The upper case 43 and the lower case 42 heat fuse and seal an outer circumferential surface of the battery case 40 in a state in which the stacked type electrode assembly 20 is embedded.

Figure 2:
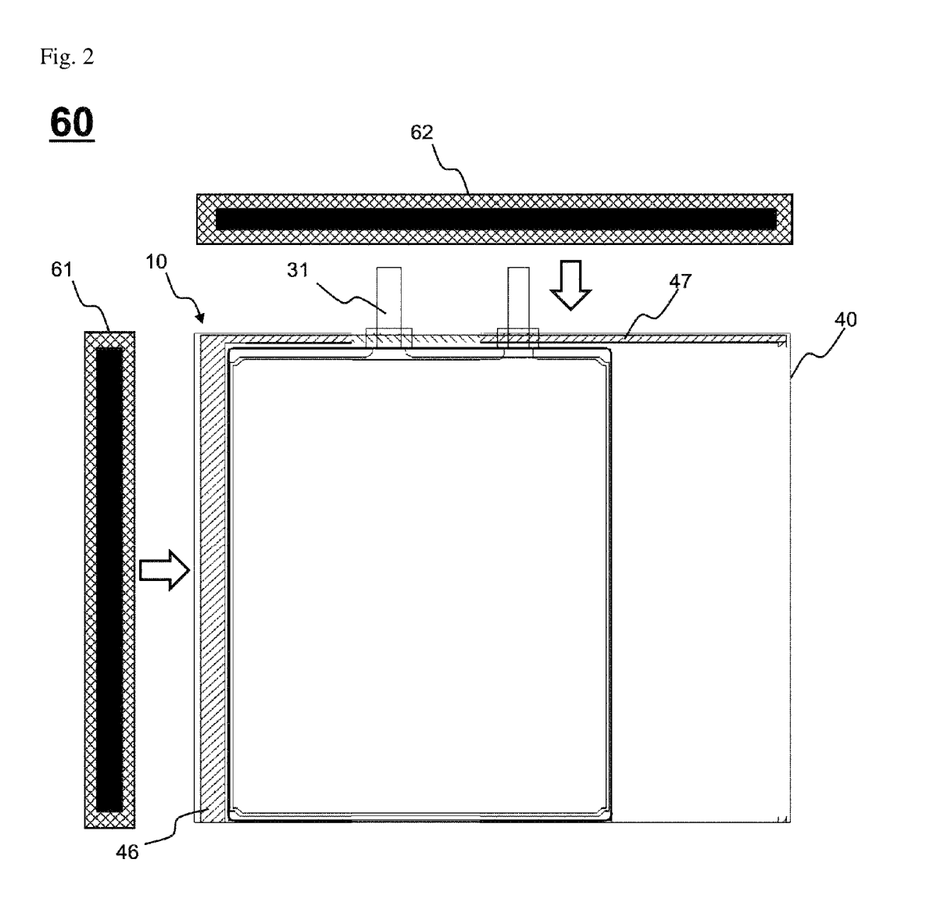
FIG. 2 is a schematic plan view showing formation of a sealed surplus portion of a pouch type battery cell by using a typical conventional battery cell manufacturing apparatus.

FIG. 2 is a schematic plan view showing formation of a sealing surplus portion of a pouch type battery cell by using a typical conventional battery cell manufacturing apparatus.

Referring to FIG. 2, a manufacturing apparatus 60 of a pouch type battery cell 10 in a related art has a sealing device 61 for performing a process of sealing one side portion 46 in an outer periphery of a pouch type case 40 and a sealing device 62 for performing a process of sealing an upper end portion 47 in the outer periphery separately.

Accordingly, in the case of performing a sealing process of the pouch type case 40 of the pouch type battery cell 10 in the related art, the sealing process has been carried out in two stages separately in a sealing process of the one side portion 46 and a sealing process of the upper end portion 47 of the outer periphery of the pouch type case 40 by thermally pressing.

However, in a process of sealing an upper end of the pouch type case 40, since thermal conduction is easily caused because an electrode terminal 31 formed of a metal material are disposed, it takes more time to heat the upper end portion 47 of the pouch type case 40 compared with the sealing process of the one side portion 46 in which the electrode terminal 31 are not formed, and thus the sealing process of the one side portion 46 and that of the upper end portion 47 may not be performed simultaneously by one heating member. Therefore, the sealing process of the pouch type case was divided into and performed in two stages, and there was problem that the manufacturing cost is increased due to equipment cost and delay of manufacturing time.

Therefore, there is a great need for technology that can fundamentally solve such problems.

DISCLOSURE

Technical Problem

The present disclosure is provided to solve the above technical problems of the related art.

In particular, a battery cell manufacturing apparatus of the present disclosure effectively reduces time for a sealing process of a pouch type case, when an outer periphery of the pouch type case is induction-heated by a magnetic field generated in induction heating coils up to a temperature at which heat fusion is possible to form a sealing surplus portion.

Technical Solution

According to one aspect of the present disclosure, there is provided a battery cell manufacturing apparatus, which is an apparatus for manufacturing a battery cell configured to form a sealing surplus portion by thermally fusing an outer periphery of a pouch type case by using induction heating, the apparatus including: a cradle configured to fix and mount a battery cell; at least one induction heating coils formed by winding an electrical wire at least one time at a position corresponding to the outer periphery to generate an induced current in the outer periphery of the pouch type case on which the sealing surplus portion is to be formed; a power supply configured to supply an alternating current to the induction heating coils; and at least two pressing members configured to press both sides of the outer periphery of the pouch type case on which the sealing surplus portion is to be formed, and the outer periphery of the pouch type case is induction-heated by a magnetic field generated in the induction heating coils and up to a temperature at which heat fusion is possible to form the sealing surplus portion.

Here, the induction heating, which is also referred to as a radio heater, uses a principle in which when an alternating current is applied to a coil after placing a metal conductor, which is to be a heating objet, in the coil, an eddy current is generated in the metal conductor, which is the heating objet, and the metal conductor is heated by itself due to a loss of the generated eddy current.

Accordingly, in the battery cell manufacturing apparatus according to the present disclosure, when the outer periphery of the pouch type case is induction-heated by the magnetic field generated in the induction heating coils up to the temperature at which heat fusion is possible to form the sealing surplus portion, one side portion of the outer periphery of the pouch type case and upper and lower end portions of the pouch type case may be simultaneously subjected to a sealing process and may be thermally pressed and sealed so that a time for the sealing process is shortened unlike in the related art in which the sealing process of the pouch type case is performed in two stages.

That is, in the battery cell manufacturing apparatus of the present disclosure, since an entire outer periphery of the pouch type case is heated using the induction heating principle, the sealing process of the one side portion of the outer periphery and the sealing process of the upper and lower end portions of the outer periphery may be performed simultaneously.

In one specific example, the pouch type case may include a first resin layer which is an inner layer having thermal fusion properties, a metal layer having material blocking properties, and a second resin layer which is an outer layer, from an inside to an outside of the battery cell.

In one specific example, the magnetic field generated by the induction heating coils may generate an induced current in the metal layer of the pouch type case to heat the outer periphery of the pouch type case. Specifically, the metal layer may be made of aluminum or an aluminum alloy.

In one specific example, the temperature at which the heat fusion is possible may be a temperature at which the first resin layer of the pouch type case is melted and may be in a range of 150° C. to 250° C.

In one specific example, the first resin layer may be one or more selected from the group consisting of polyethylene (PE), polypropylene (PP), PE-PP copolymer, and PE-PP blending resin, and the second layer may be one or more selected from the group consisting of polyethylene terephthalate (PET), tetron-based resin, vinylon-based resin, and nylon-based resin.

In one specific example, the induction heating coils may have a "☐" shape when viewed from above, and include a first induction heating coil and a second induction heating coil, which are respectively positioned above and below the battery cell with respect to the ground.

In order to reduce differences in intensities of a magnetic field generated in each of the first induction heating coil and the second induction heating coil, the first induction heating coil and the second induction heating coil may have the same number of windings of the electrical wire. To this end, magnitude and direction of an alternating current flowing in each of the first induction heating coil and the second induction heating coil may be set to be equal to each other.

In one specific example, a winding shape of the induction heating coils may be a shape having a size corresponding to the outer periphery of the pouch type case, and the induction heating coils may be spaced apart from the pouch type case at positions corresponding to the outer periphery of the pouch type case on which the sealing surplus portion is to be formed.

In one specific example, the induction heating coils may be set to supply a high frequency alternating current of 40 Hz or more to 100 Hz or less so that an induced current generated by the high frequency alternating current flowing in the induction heating coils may be concentrated on the outer periphery of the pouch type case by 50% or more based on the total induced current.

In one specific example, the pressing members may be electrical insulators, and specifically, may have a "⊏"-shape when viewed from above, and may be formed so as to face an upper and lower surfaces of the pouch type case with respect to the ground.

The present disclosure also provides a method of manufacturing a battery cell using the battery cell manufacturing apparatus.

The method of manufacturing a battery cell includes:

(a) fixing and mounting a battery cell to be subjected to a sealing process to a cradle;

(b) supplying an alternating current to induction heating coils from a power supply and induction heating an outer periphery of a pouch type case to a temperature at which heat fusion is possible by a magnetic field generated in the induction heating coils; and (c) pressing and thermally fusing at least two pressing members at positions corresponding to the outer periphery of the pouch type case.

In one specific example, the temperature at which the heat fusion is possible may range from 150° C. to 250° C.

A high frequency alternating current of 40 Hz or more to 100 Hz or less may be supplied to the induction heating coils.

The battery cell may be a lithium secondary battery having high energy density, discharge voltage, and output stability. Other components of the lithium secondary battery according to the present disclosure will be described in detail below.

Generally, a lithium secondary battery includes a positive electrode, a negative electrode, a separator, and a nonaqueous electrolyte solution containing a lithium salt.

The positive electrode may be manufactured, for example, by applying a mixture of a positive electrode active material, a conductive material, and a binder on a positive electrode current collector and then drying the resultant, and a filler may be further added to the mixture as necessary.

The positive electrode active material may be a material capable of causing an electrochemical reaction, as lithium transition metal oxide, including two or more transition metals, for example, layered compounds such as lithium cobalt oxide ($LiCoO_2$), lithium nickel oxide ($LiNiO_2$), etc. substituted with one or more transition metals; lithium manganese oxide substituted with one or more transition metals; lithium nickel-based oxide represented by Chemical Formula $LiNi_{1-y}M_yO_2$ (in which, M=Co, Mn, Al, Cu, Fe, Mg, B, Cr, Zn or Ga, and containing at least one element of the above elements, $0.01 \leq y \leq 0.7$); lithium nickel cobalt manganese composite oxide represented by Chemical Formula $Li_{1+z}Ni_bMn_cCo_{1-(b+c+d)}M_dO_{(2-e)}A_e$ (in which, $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d \leq 1$, M=Al, Mg, Cr, Ti, Si or Y, and A=F, P or Cl) such as $Li_{1+z}Ni_{1/3}Co_{1/3}Mn_{1/3}O_2$, $Li_{1+z}Ni_{0.4}Mn_{0.4}Co_{0.2}O_2$, etc.; olivine-based lithium metal phosphate represented by Chemical Formula $Li_{1+x}M_{1-y}M'_yPO_{4-z}X_z$ (in which, M=transition metal, preferably Fe, Mn, Co or Ni, and M'=Al, Mg or Ti, and X=F, S or N, and $-0.5 \leq x \leq +0.5$, $0 \leq y \leq 0.5$, $0 \leq z \leq 0.1$), and the like. However, the present disclosure is not limited thereto.

Generally, the conductive material is added in an amount of 1 to 20 wt % based on the total weight of a mixture including the positive electrode active material. The conductive agent is not particularly restricted so long as the conductive agent exhibits high conductivity while the conductive agent does not induce any chemical change in a battery to which the conductive agent is applied. Examples of the conductive material include graphite such as natural graphite, artificial graphite, etc.; carbon blacks such as carbon black, acetylene black, Ketjen black, channel black, furnace black, lamp black, thermal black, etc.; conductive fibers such as carbon fibers, metal fibers, etc.; metallic powders such as carbon fluoride powders, aluminum powders, nickel powders, etc.; conductive whiskers such as zinc oxide, potassium titanate, etc.; conductive metal oxides such as titanium oxide, etc.; conductive materials such as polyphenylene derivatives, etc.

The filler is a component that suppresses the expansion of a positive electrode and is selectively used. Any material not inducing a chemical change to the battery and having a fiber phase may be used without limitation. For example, an olefin-based polymer such as polyethylene, polypropylene, or the like; a fiber phase material such as glass fiber, carbon fiber, or the like. may be used.

Further, the negative electrode may be manufactured, for example, by applying a mixture of a negative electrode active material, a conductive material, and a binder on a negative electrode current collector, and followed by drying. A filler may be further added to the mixture as necessary. Further, the negative electrode active material may be at least one selected from the group consisting of graphite carbon, coke-based carbon and hard carbon.

The elements of the battery cells described above are well known in the art, and thus a description thereof will be omitted in the present disclosure.

Effects of the Invention

As described above, in a battery cell manufacturing apparatus according to the present disclosure, when an outer periphery of a pouch type case is induction-heated by a magnetic field generated in induction heating coils up to a temperature at which heat fusion is possible to form a sealing surplus portion, one side portion of the outer periphery of the pouch type case and upper and lower end portions of the pouch type case can be simultaneously subjected to a sealing process and can be thermally pressed and sealed so that time for the sealing process is shortened unlike in the related art in which the sealing process of the pouch type case is performed in two stages.

DETAILED DESCRIPTION OF THE PREFERRED EMBODIMENTS

Hereinafter, exemplary embodiments of the present disclosure will be described in detail with reference to the drawings, and the scope of the present disclosure is not limited thereto.

Figure 3:
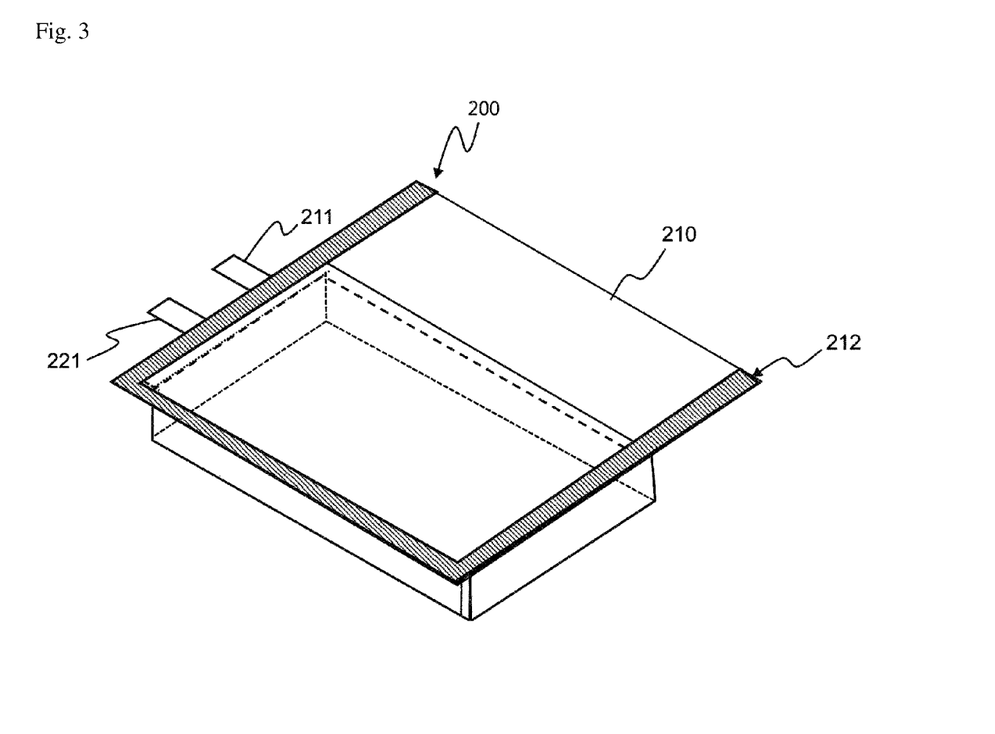
FIG. 3 is a schematic perspective view showing a state before a sealing process of a battery cell according to one exemplary embodiment of the present disclosure.
Figure 4:
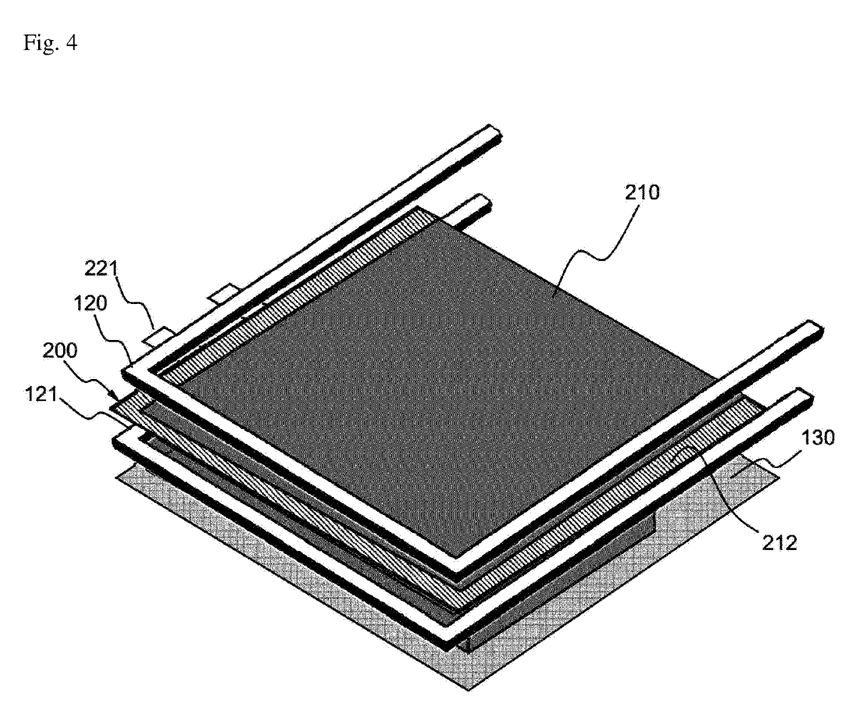
FIG. 4 is a schematic exploded perspective view showing a battery cell and a cradle and pressing members of a battery cell manufacturing apparatus according to one exemplary embodiment of the present disclosure.
Figure 5:
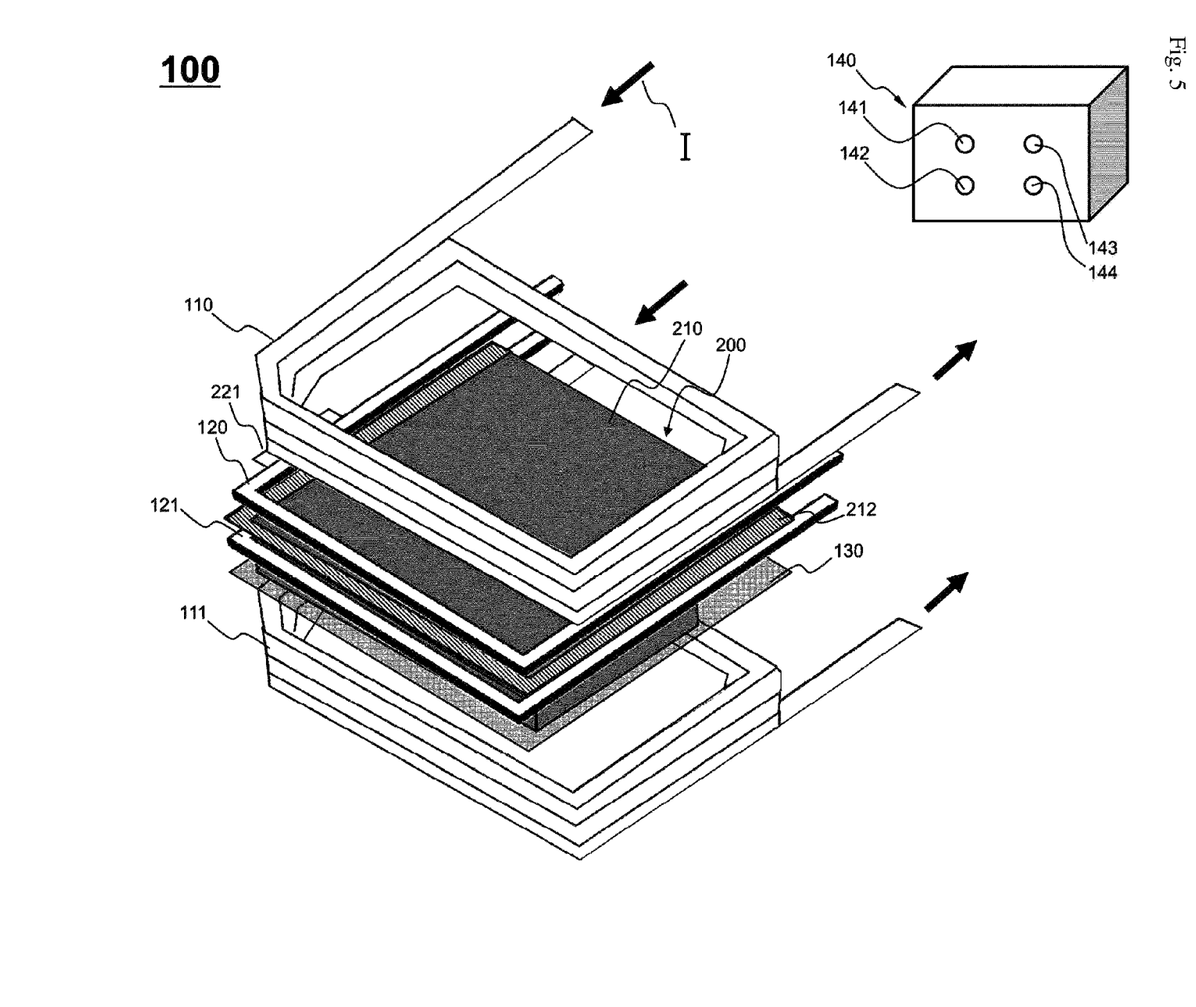
FIG. 5 is a schematic exploded perspective view showing a battery cell and a battery cell manufacturing apparatus according to one exemplary embodiment of the present disclosure.

FIG. 3 is a schematic perspective view showing a state before a sealing process of a battery cell according to one embodiment of the present disclosure is performed, FIG. 4 is a schematic exploded perspective view showing a battery cell and a cradle and pressing members of a battery cell manufacturing apparatus according to one embodiment of the present disclosure, and FIG. 5 is a schematic exploded perspective view showing a battery cell and the battery cell manufacturing apparatus according to one embodiment of the present disclosure.

Referring to FIGS. 3 to 5, a battery cell manufacturing apparatus 100 according to the present disclosure is an apparatus configured to form a sealing surplus portion by thermally fusing an outer periphery 212 of a pouch type case 210 by using induction heating.

Specifically, the battery cell manufacturing apparatus 100 includes a cradle 130 configured to fix and mount a battery cell 200, two induction heating coils 110 and 111 formed by winding an electrical wire at least one time at a position corresponding to the outer periphery 212 to generate an induced current in the outer periphery 212 of the pouch type case 210 on which the sealing surplus portion is to be formed, a power supply 140 configured to supply an alternating current to the induction heating coils 110 and 111, and at least two pressing members 120 and 121 configured to press both sides of the outer periphery 212 of the pouch type case 210 on which the sealing surplus portion is to be formed.

Here, the power supply 140 includes connection terminals 141, 142, 143, and 144 configured to supply an alternating current I to the induction heating coil 110.

Further, the outer periphery 212 of the pouch type case 210 is induction-heated by a magnetic field generated in the induction heating coil 110 up to a temperature at which heat fusion is possible to form the sealing surplus portion.

The induction heating coil 110 has a "☐"-shape when viewed from above, and a first induction heating coil 110 and a second induction heating coil 111 are respectively positioned above and below the battery cell 200 with respect to the ground.

Here, in order to reduce the difference in intensities of a magnetic field generated in each of the first induction heating coil 110 and the second induction heating coil 111, the first induction heating coil 110 and the second induction heating coil 111 have the same number of windings of the electrical wire. To this end, magnitude and direction of the alternating current I flowing in each of the first induction heating coil 110 and the second induction heating coil 111 are set to be equal to each other.

Meanwhile, a winding shape of the induction heating coil 110 is a shape having a size corresponding to the outer periphery 212 of the pouch type case 210, and the induction heating coil 110 is spaced apart from the pouch type case 210 at positions corresponding to the outer periphery 212 of the pouch type case 210 on which the sealing surplus portion is to be formed.

Further, the power supply 140 is set to supply a high frequency alternating current of 40 Hz or more to 100 Hz or less to the induction heating coil 110 so that an induced current generated by the high frequency alternating current flowing in the induction heating coil 110 is concentrated on the outer periphery 212 of the pouch type case 210 by 50% or more based on the total induced current.

Figure 6:
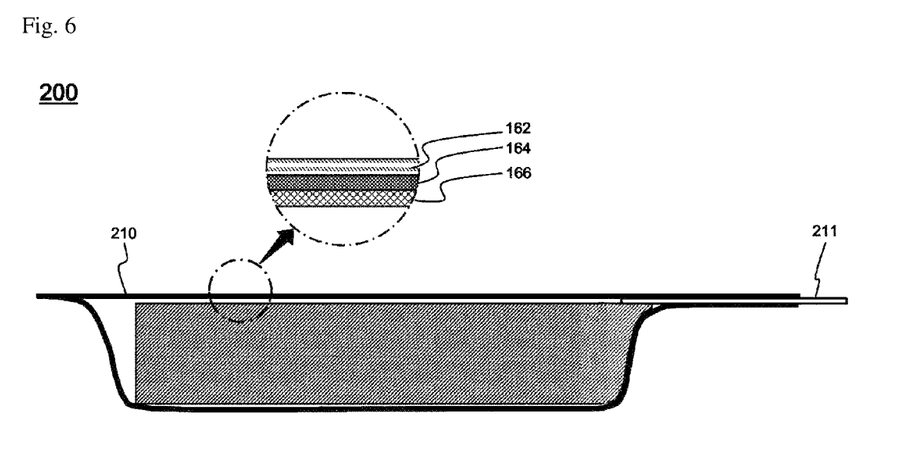
FIG. 6 is a schematic perspective view showing a cross-sectional view and a partially enlarged view of a battery cell according to one exemplary embodiment of the present disclosure.

Here, the pressing member 120 is electrical insulators, has a "shape" when viewed from above, and the pressing members 120 and 121 are formed so as to face an upper and lower surfaces of the pouch type case 210 with respect to the ground. FIG. 6 is a schematic perspective view showing a cross-sectional view and a partially enlarged view of a battery cell according to one embodiment of the present disclosure.

Referring to FIGS. 3 and 6, the pouch type case 210 includes a first resin layer 166 which is an inner layer having thermal fusion properties, a metal layer 164 having material blocking properties, and a second resin layer 162 which is an outer layer, from an inside to an outside of the battery cell 200.

Accordingly, the magnetic field generated by the induction heating coils 110 and 111 generates an induced current in the metal layer 164 of the pouch type case 210 to heat the outer periphery 212 of the pouch type case 210. Here, the metal layer 164 is made of aluminum or an aluminum alloy.

Further, the temperature at which the outer periphery 212 of the pouch type case 210 can be thermally fused is the temperature at which the first resin layer 166 of the pouch type case 210 is melted and ranges from 150° C. to 250° C.

Here, the first resin layer 166 is made of polypropylene (PP) and the second resin layer 162 is made of polyethylene terephthalate (PET) resin.

As described above, in a battery cell manufacturing apparatus according to the present disclosure, when an outer periphery of a pouch type case is induction-heated by a magnetic field generated in induction heating coils up to a temperature at which heat fusion for forming a sealing surplus portion is possible, one side portion of an outer periphery of the pouch type case and upper and lower end portions of the pouch type case can be simultaneously subjected to the sealing process and can be thermally pressed and sealed so that the sealing process time can be shortened unlike in the related art in which the sealing process of the pouch type case is performed in two stages.

The invention claimed is:

1. A battery cell manufacturing apparatus for forming a sealing surplus portion by thermally fusing an outer periphery of a pouch type case by using induction heating, comprising:
a cradle configured to fix and mount a battery cell;
one or more induction heating coils formed by winding an electrical wire at least one time at a position corresponding to the outer periphery to generate an induced current in the outer periphery of the pouch type case on which the sealing surplus portion is to be formed, the one or more induction heating coils each being wound about a winding axis;
a power supply configured to supply an alternating current to the induction heating coils; and
at least two pressing members configured to press both sides of the outer periphery of the pouch type case on which the sealing surplus portion is to be formed, the at least two pressing members extending in respective planes that are parallel to one another and perpendicular to the winding axis,
wherein the battery cell manufacturing apparatus is configured such that in use, the outer periphery of the pouch type case is induction-heated by a magnetic field generated in the induction heating coils and up to a temperature at which heat fusion is possible to form the sealing surplus portion.

2. The battery cell manufacturing apparatus of claim 1, wherein the pouch type case comprises a first resin layer which is an inner layer having thermal fusion properties, a metal layer having material blocking properties, and a second resin layer which is an outer layer, from inside to outside of the battery cell.

3. The battery cell manufacturing apparatus of claim 2, wherein the magnetic field generated by the induction heating coils generates an induced current in the metal layer of the pouch type case to heat the outer periphery of the pouch type case.

4. The battery cell manufacturing apparatus of claim 3, wherein the metal layer is made of aluminum or an aluminum alloy.

5. The battery cell manufacturing apparatus of claim 1, wherein the temperature at which the heat fusion is possible is a temperature at which the first resin layer of the pouch type case is melted.

6. The battery cell manufacturing apparatus of claim 5, wherein the temperature at which the first resin layer is melted is in a range of 150° C. to 250° C.

7. The battery cell manufacturing apparatus of claim 2, wherein the first resin layer is one or more selected from the group consisting of polyethylene (PE), polypropylene (PP), PE-PP copolymer, and PE-PP blending resin, and the second layer is one or more selected from the group consisting of polyethylene terephthalate (PET), tetron-based resin, vinylon-based resin, and nylon-based resin.

8. The battery cell manufacturing apparatus of claim 1, wherein the induction heating coils have a "☐" shape when viewed from above.

9. The battery cell manufacturing apparatus of claim 1, wherein the induction heating coils include a first induction heating coil and a second induction heating coil, which are respectively positioned above and below the battery cell with respect to the ground.

10. The battery cell manufacturing apparatus of claim 9, wherein the first induction heating coil and the second induction heating coil have the same number of windings of the electrical wire.

11. The battery cell manufacturing apparatus of claim 9, wherein magnitude and direction of an alternating current flowing in each of the first induction heating coil and the second induction heating coil are equal to each other.

12. The battery cell manufacturing apparatus of claim 1, wherein a winding shape of the induction heating coils is a shape having a size corresponding to the outer periphery of the pouch type case.

13. The battery cell manufacturing apparatus of claim 12, wherein the induction heating coils are spaced apart from the pouch type case at positions corresponding to the outer periphery of the pouch type case on which the sealing surplus portion is to be formed.

14. The battery cell manufacturing apparatus of claim 1, wherein the induction heating coils is supplied with a high frequency alternating current of 40 Hz or more to 100 Hz or less.

15. The battery cell manufacturing apparatus of claim 14, wherein an induced current generated by the high frequency alternating current flowing in the induction heating coils is concentrated on the outer periphery of the pouch type case by 50% or more based on the total induced current.

16. The battery cell manufacturing apparatus of claim 1, wherein the pressing members are electrical insulators.

17. The battery cell manufacturing apparatus of claim 1, wherein the pressing members have a "⊏"-shape when viewed from above.

18. The battery cell manufacturing apparatus of claim 1, wherein the pressing members face upper and lower surfaces of the pouch type case with respect to the ground.

19. A method of manufacturing a battery cell using the battery cell manufacturing apparatus according to claim 1, including:
   (a) fixing and mounting the battery cell to be subjected to a sealing process to the cradle;
   (b) supplying the alternating current to the induction heating coils from the power supply and induction heating the outer periphery of the pouch type case to the temperature at which heat fusion is possible by the magnetic field generated in the induction heating coils; and
   (c) pressing and thermally fusing the at least two pressing members at positions corresponding to the outer periphery of the pouch type case.

* * * * *